(12) United States Patent
Lee et al.

(10) Patent No.: US 9,728,019 B2
(45) Date of Patent: *Aug. 8, 2017

(54) CAR CONTROL SYSTEM

(71) Applicant: KT Corporation, Seongnam-si (KR)

(72) Inventors: Min-Gu Lee, Seongnam-si (KR);
Dong-Wan Kim, Seoul (KR);
Soon-Hyang Park, Anyang-si (KR);
Jong-Han Park, Seoul (KR);
Won-Young Jeong, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,455

(22) Filed: Dec. 22, 2015

(65) Prior Publication Data

US 2016/0140785 A1    May 19, 2016

Related U.S. Application Data

(63) Continuation of application No. 13/495,761, filed on Jun. 13, 2012, now Pat. No. 9,248,807.

(30) Foreign Application Priority Data

Jun. 13, 2011 (KR) .......................... 10-2011-0056748

(51) Int. Cl.
*B60R 25/24* (2013.01)
*G07C 9/00* (2006.01)
*B60R 25/20* (2013.01)
*B60Q 1/52* (2006.01)
*B60R 25/30* (2013.01)
*F02N 11/08* (2006.01)

(52) U.S. Cl.
CPC ............ *G07C 9/00007* (2013.01); *B60Q 1/52* (2013.01); *B60R 25/2018* (2013.01); *B60R 25/30* (2013.01); *F02N 11/0807* (2013.01); *G07C 9/00309* (2013.01); *B60R 25/24* (2013.01); *G07C 2009/00769* (2013.01)

(58) Field of Classification Search
None
See application file for complete search history.

(56) References Cited

U.S. PATENT DOCUMENTS 7,801,507 B2 * 9/2010 Benco et al. ................. 455/410
7,864,987 B2    1/2011 Venkatanna et al.
9,248,807 B2 * 2/2016 Lee et al. ................. 340/426.13
2002/0135466 A1  9/2002 Bunyan
(Continued)

*Primary Examiner* — Brent Swarthout
(74) *Attorney, Agent, or Firm* — Sughrue Mion, PLLC

(57) ABSTRACT

A car control system is disclosed. The car control system for controlling a car by being linked with a car control device (electronic control unit, ECU) that is installed inside the car for electronic control of the car can include: an authentication server configured to perform access authentication for a user terminal and configured to generate an authentication result based on least one of terminal information of the user terminal and vehicle identification information; and a car access device configured to be directly connected with the car control device through an internal network of the car and configured to determine whether a car control request for control of the car by the user terminal is to be relayed to the car control device according to the authentication result of the user terminal.

4 Claims, 9 Drawing Sheets

(56) References Cited

U.S. PATENT DOCUMENTS

| | | |
|---|---|---|
| 2003/0016636 A1 | 1/2003 | Tari et al. |
| 2009/0195370 A1 | 8/2009 | Huffman et al. |
| 2009/0243821 A1 | 10/2009 | Tieman et al. |
| 2012/0254960 A1 | 10/2012 | Lortz et al. |
| 2013/0031604 A1 | 1/2013 | Esselink et al. |
| 2016/0082926 A1* | 3/2016 | Mouser ................ B60R 25/252 701/2 |

* cited by examiner

CAR CONTROL SYSTEM

CROSS-REFERENCE TO RELATED APPLICATIONS

This is a Continuation of application Ser. No. 13/495,761 filed Jun. 13, 2012, now U.S. Pat. No. 9,248,807, which claims the benefit of priority from the Korean Patent Application No. 10-2011-0056748, filed with the Korean Intellectual Property Office on Jun. 13, 2011, the disclosures of which are incorporated herein by reference in their entireties.

BACKGROUND

1. Technical Field

Exemplary embodiments relate to a car control system, and more specifically, exemplary embodiments relate to a system for controlling a motor vehicle by use of a user terminal.

2. Description of Related Art

As automobiles have been pervasive with the economic growth, various kinds of technologies for enhancing the convenience of using the automobiles were also developed, for example, in the area of smart key systems. A smart key system allows for a remote control of the ignition of a motor vehicle and setting an alarm system by use of a wireless communication technology, rather than controlling the ignition of the car by inserting or operating a mechanical control device.

However, the related art smart key system has required the user to have a smart key separately in order to utilize the smart key system.

SUMMARY

Therefore, it is an aspect to provide a system for controlling a motor vehicle by use of a user terminal.

Another aspect is to provide a car control system that does not require a separate smart key for controlling the car and can disallow and/or control the car from being accessed in case the car is stolen.

Yet another aspect is to provide a car control system that can provide location information of the car by assessing the location of the car.

Another aspect is to provide a car control system for controlling a car by being linked with a car control device (electronic control unit, ECU) that is installed inside the car for electronic control of the car.

The car control system which controls a car by being linked with a car control device (electronic control unit, ECU) that is installed inside the car for electronic control of the car in accordance with an exemplary embodiment can include: an authentication server configured to perform access authentication for a user terminal and configured to generate an authentication result based on at least one of terminal information of the user terminal and vehicle identification information. The car control system may further include a car access device configured to connect to the car control device and configured to determine whether a car control request for control of the car by the user terminal is to be relayed to the car control device according to the authentication result of the user terminal obtained through the authentication server.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF EXEMPLARY EMBODIMENTS

Since there can be a variety of permutations and exemplary embodiments, certain exemplary embodiments will be illustrated and described with reference to the accompanying drawings. This, however, is by no means to restrict the present disclosure to certain exemplary embodiments, and shall be construed as including all permutations, equivalents and substitutes covered by the ideas and scope of the present disclosure. Throughout the description of exemplary embodiments, when describing a certain technology is determined to evade the point of the exemplary embodiment, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain exemplary embodiments only, and shall by no means restrict the present disclosure. Unless clearly used otherwise, expressions in a singular form include a meaning of a plural form. In the present disclosure, an expression such as "comprising" or "including" is intended to designate a characteristic, a number, a step, an operation, an element, a part or combinations thereof, and will not be construed to preclude any presence or possibility of one or more other characteristics, numbers, steps, operations, elements, parts or combinations thereof.

Hereinafter, certain exemplary embodiments will be described with reference to the accompanying drawings.

Figure 1:
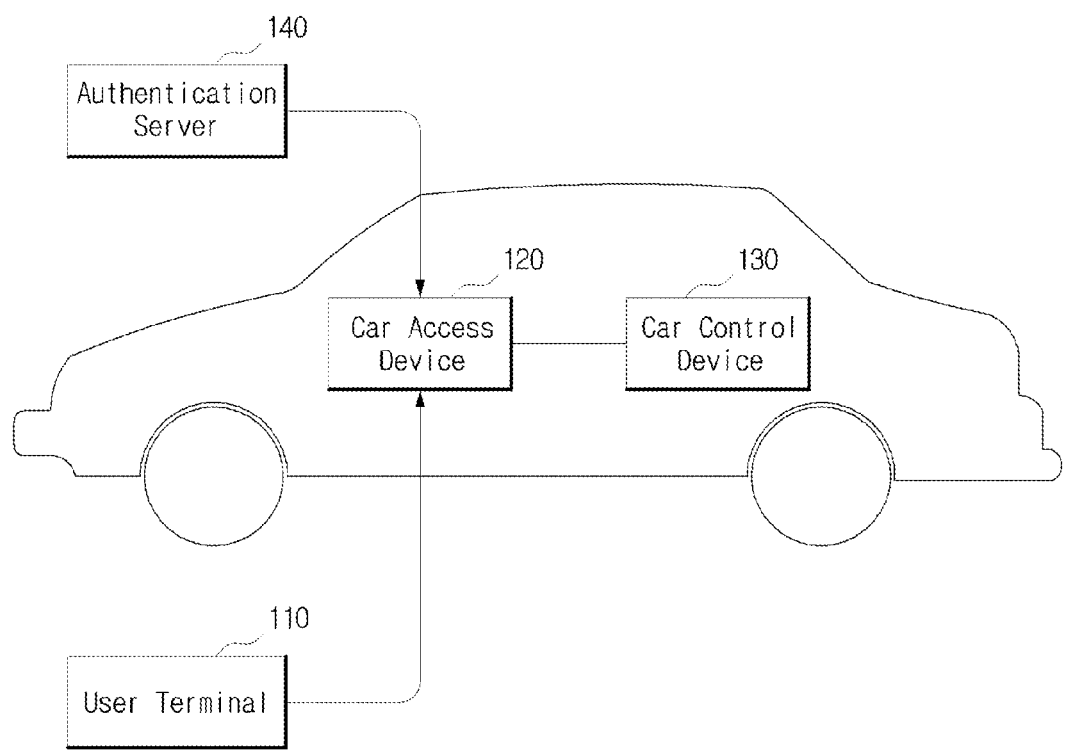
FIG. 1 is a block diagram illustrating a car control system that controls a car by use of a user terminal in accordance with an exemplary embodiment.

FIG. 1 is a block diagram illustrating a car control system that controls a car by use of a user terminal in accordance with an exemplary embodiment.

Referring to FIG. 1, the car control system includes a user terminal 110, a car access device 120, a car control device 130 and an authentication server 140. Here, as illustrated in FIG. 1, the car access device 120 and the car control device 130 are equipped or installed inside the car. In an exemplary embodiment, the car access device 120 and the car control device 130 include a hardware microprocessor and a memory.

The user terminal 110 is a device that can access the car access device 120 through a short-range wireless communication, can be connected with the car control device 130 through the car access device 120 based on the result of access authentication for controlling the car, and can control the car or be provided with various information (e.g., state of the car) about the car.

Hereinafter, even though no particular description is provided, it shall be understood that an application for controlling the car is installed in the user terminal 110 and a request for controlling the car is transmitted to the car access device 120 through the application.

For example, a mobile communication terminal, a PDA, and a smart phone, or any portable device having the short-range wireless communication function can be used as the user terminal 110 in an exemplary embodiment. In an exemplary embodiment, the user terminal 110 includes a memory and a hardware microprocessor.

The car access device 120 is installed inside the car and is connected with the car control device 130, which electronically controls the car, through an internal network of the car. The car access device 120 also determines whether the request for controlling the car from the user terminal 110 is to be relayed to the car control device 130 based on the result of access authentication of the user terminal 110. For instance, the car access device 120 can determine a car control state (i.e., the mode of control of the car) according to at least one of a communication connection state with the authentication server 140 and the result of access authentication of the user terminal 110, and can also notify the car control state to the car control device 130 or restrictively relay the request for controlling the car by the user terminal 110 so that the car can be driven according to the determined car control state. This will be described later in more detail with reference to the relevant drawing.

Moreover, the car access device 120 can be connected with the user terminal 110 through a first communication method and with the authentication server 140 through a second communication method. Here, the first communication method can be a short-range communication method, and the second communication method can be a wide area (WAN) communication method.

The car access device 120 is directly linked with the car control device 130, which electronically controls the car, to perform a gateway function between the user terminal 110 and the car control device 130.

For example, after receiving a request for access authentication including terminal information from the user terminal 110, the car access device 120 can receive vehicle identification information from the car control device 130 and then send an authentication request including the terminal information and the vehicle identification information to the authentication server 140 to request for authentication of the user terminal 110. Then, the car access device 120 can receive a result of an authentication from the authentication server 140 and perform the gateway function between the user terminal 110 and the car control device 130 according to the received result of authentication to allow the user terminal 110 to control the car or be provided with vehicle state information.

The car control device 130 is an ECU (Electronic Control Unit), which is installed in the car to control the engine, automatic transmission, anti-lock braking system, etc. Since the way the vehicle is controlled or the vehicle state information is obtained through the car control device 130 is well known to persons of ordinary skill in the art, no specific description thereof will be provided herein. Here, the car control device 130 is connected with the car access device 120 through an individual secure channel that is connected directly through a wired or wireless internal network of the car.

The authentication server 140 is linked with the car access device 120 to authenticate access rights of the user terminal to the car.

For example, the authentication server 140 can receive the authentication request including at least one of the terminal information of the user terminal 110 and the vehicle identification information of the car from the car access device 120. Here, the terminal information can be, for example, a telephone number or an IMSI (International Mobile Subscriber Identity). It shall be also appreciated that the terminal information can be other information (e.g., MAC) that can identify the user terminal 110.

Accordingly, the authentication server 140 can use at least one of the terminal information and the vehicle identification information included in the authentication request for comparison against pre-registered authentication information to authenticate whether the user terminal 110 has proper control rights for the vehicle and send an authentication result to the car access device 120. Here, the authentication result can be either authentication success or authentication failure.

Moreover, the authentication server 140 can send pre-registered terminal information together with the authentication result to the car access device 120, just in case a link with the car access device 120 is not available.

Hereinafter, a method of authenticating the user terminal through the car access device according to an exemplary embodiment will be described with reference to FIG. 2.

Figure 2:
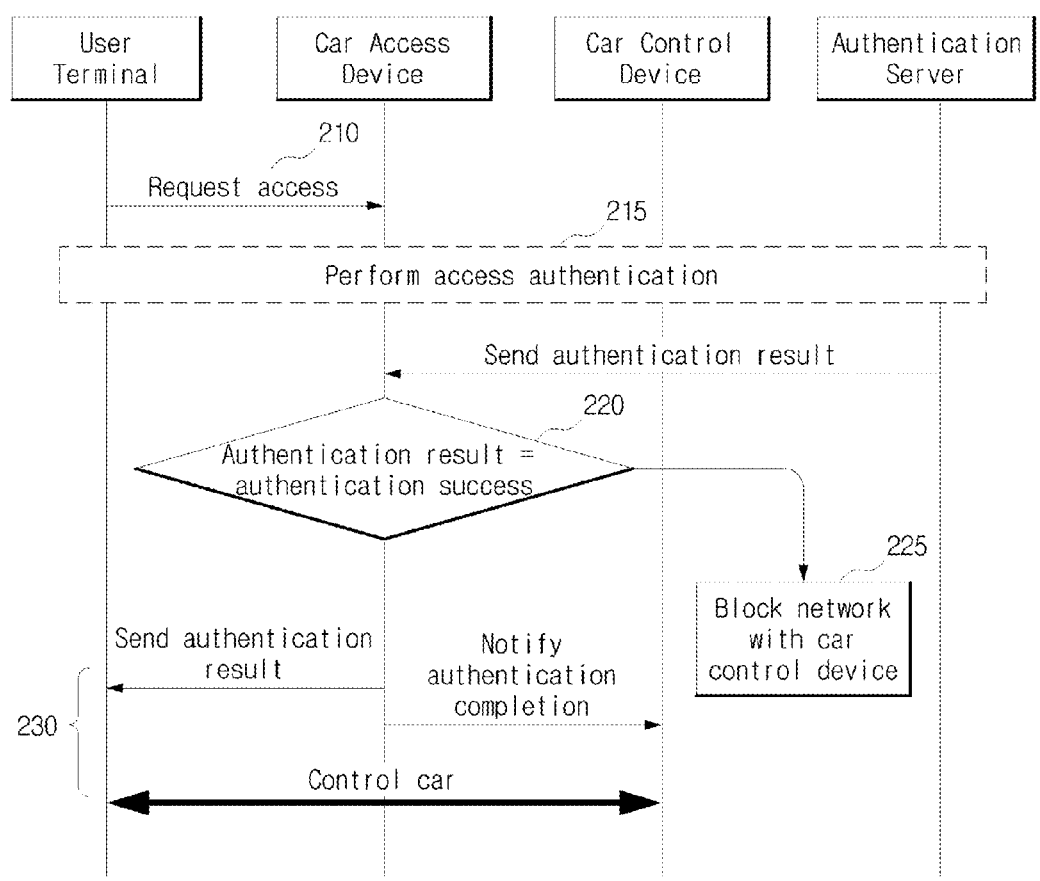
FIG. 2 is a flow diagram illustrating a method of authenticating access to a user terminal pursuant to a car control request by the user terminal in a car control system according to an exemplary embodiment.
Figure 3:
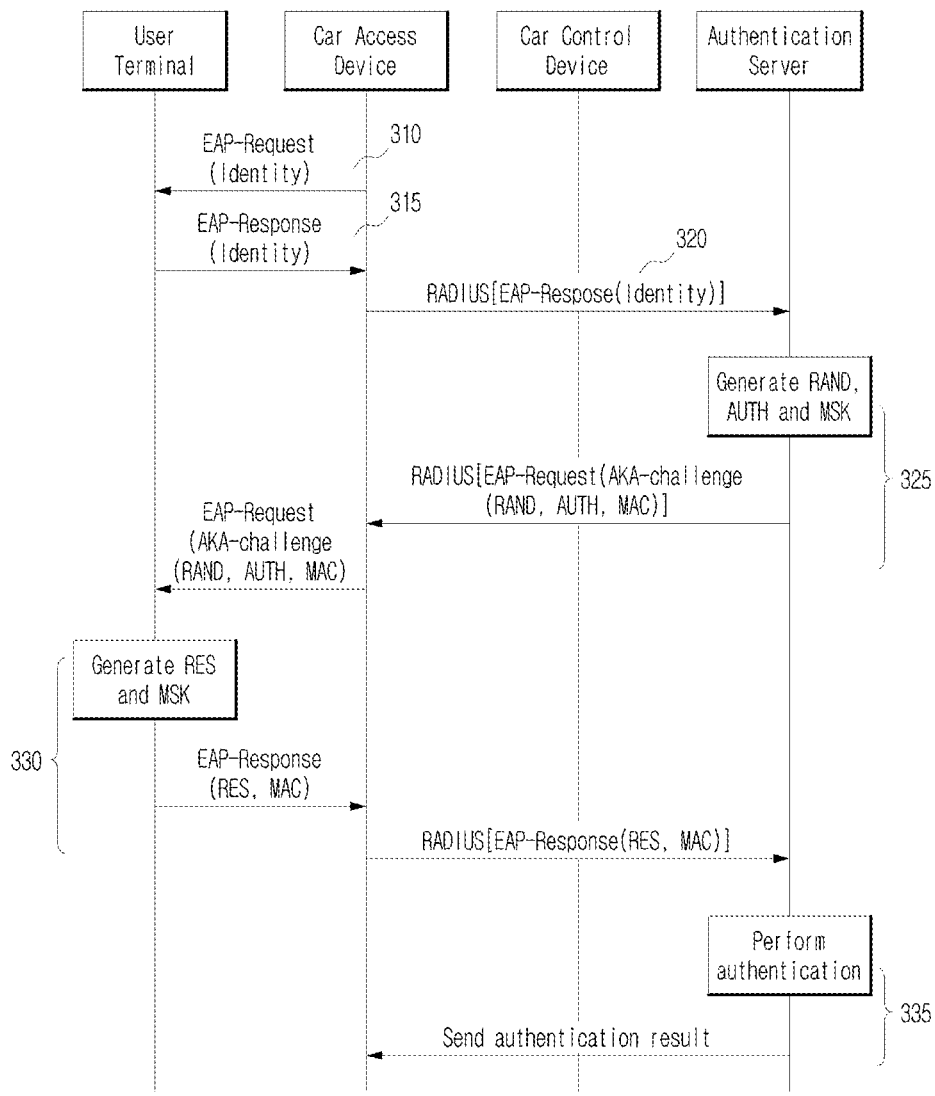
FIG. 3 is a flow diagram illustrating an access authentication in accordance with an EAP-AKA authentication method according to an exemplary embodiment.

FIG. 2 is a flow diagram illustrating a method of authenticating access of a user terminal pursuant to a car control request by the user terminal in the car control system according to an exemplary embodiment, and FIG. 3 is a flow diagram illustrating an access authentication in accordance with an EAP-AKA authentication method according to an exemplary embodiment.

As described above, the car access device 120 can be connected with the user terminal 110 through a short-range wireless communication and with the authentication server 140 through a wide area communication. Moreover, the car access device 120 can be directly connected with the ECU, which is installed inside the car, through an internal network of the car.

In operation 210, the user terminal 110 transmits an access request for controlling the car to the car access device 120 if the user terminal 110 is placed within a communicable distance of the car access device 120, which is installed inside the car.

For example, if the car access device 120 and the user terminal 110 are connected through Wi-Fi, the user terminal 110 can detect an RF signal transmitted by the car access device 120 at regular intervals and determine that the user terminal 110 is within a communicable distance of the car access device 120 based on the RF signal. Accordingly, the user terminal 110 can transmit an EAP-Start message for the access request to the car access device 120.

In operation 215, the car access device 120 becomes linked with the authentication server 140 to perform access authentication for the user terminal 110 pursuant to the access request from the user terminal 110, and receives an authentication result from the authentication server 140. Here, the authentication result can be either an authentication success or an authentication failure.

Hereinafter, it will be assumed in FIG. 3 that the user terminal 110 and the car access device 120 are connected through Wi-Fi to describe how the authentication is performed in an EAP-AKA authentication method according to an exemplary embodiment. Although it is described in an exemplary embodiment that the car access device 120 is linked with the authentication server 140 to perform access authentication according to the EAP-AKA method, it will be appreciated that the authentication method can be changed if the method for connecting the car access device 120 and the user terminal 110 is changed.

In operation 310, the car access device 120 transmits an identification information request (e.g., EAP-Request (Identity) message) that is required for authentication to the user terminal 110 pursuant to the access request of the user terminal 110.

In operation 315, the user terminal 110 transmits identification information required for the authentication to the car access device 120 pursuant to the identification information request of the car access device 120. For example, the user terminal 110 can transmit authentication information to the car access device 120 by use of an EAP-Response (Identity) message. Here, the authentication information can be, for example, IMSI. Although it is assumed herein that the user terminal 110 delivers IMSI as the authentication information to the car access device 120 because AKA authentication is used, it will be appreciated that the authentication information transmitted from the user terminal 110 to the car access device 120 can be changed if the authentication method between the user terminal 110 and the car access device 120 changes.

In operation 320, the car access device 120 transmits the authentication information received from the user terminal 110 to the authentication server 140. Here, it is assumed that the car access device 120 and the authentication server 140 communicate using a RADIUS protocol. That is, the car access device 120 can transmit the authentication information to the authentication server 140 through RADIUS (EAP-Response (Identity) message).

It will be also appreciated that it is possible for the car access device 120 and the authentication server 140 to communicate through a DIAMETER protocol, in addition to the RADIUS protocol.

In operation 325, pursuant to receiving the authentication information for the user terminal 110 through the car access device 120, the authentication server uses the authentication information to generate an authentication vector and transmits the generated authentication vector to the user terminal 110 through the car access device 120.

For example, the authentication server 140 can transmit the authentication vector to the car access device 120 through a RADIUS (EAP-Request (AKA-Challenge (RAND, AUTH, MAC))) message, and the car access device 120 can transmit the authentication vector to the user terminal 110 through EAP-Request (AKA-Challenge (RAND, AUTH, MAC)). Here, the authentication vector includes a random identification variable value (RAND), an authentication field (AUTH) and a message authentication code (MAC).

Accordingly, in operation 330, the user terminal 110 uses the authentication vector to perform server authentication and generates an authentication value, which is then transmitted to the authentication server 140 through the car access device 120.

For example, the user terminal 110 can capsulize the generated authentication value (e.g., RES) and the message authentication code into AKA-Challenge and transmit the RES and MAC to the car access device 120 through the EAP-Response message, and the car access device 120 can transmit the EAP-Response message to the authentication server 140 through the RADIUS protocol.

Here, the car access device 120 can further include the vehicle identification information stored in the car access device 120 in the RADIUS protocol for transmission to the authentication server 140. Here, the vehicle identification information can be one of a vehicle engine number and a chassis number that are stored in the car access device 120. It is also possible that the vehicle identification information is the only identification information assigned to the car access device 120, for example, the MAC.

In operation 335, the authentication server 140 uses at least one of the authentication value and the vehicle identification information received through the car access device 120 to transmit the authentication result to the car access device 120.

Referring back to FIG. 2, in operation 220, the car access device 120 determines whether the authentication result received from the authentication server 140 is an authentication success.

If the authentication result is an authentication failure, the car access device 120 transmits an authentication failure message (EAP-Failure) to the user terminal 110 and blocks the network with the car control device 130.

As such, if the authentication result of the access authentication for the user terminal is an authentication failure, the car access device 120 can block a future car control request from the user terminal 110 without relaying the car control request to the car control device 130 in order to disable the car control by the user terminal 110.

If, however, the authentication result is authentication success, in operation 230, the car access device 120 transmits an authentication success message (EAP-Success) to the user terminal 110 and then transmits an authentication completion notification message to the car control device 130.

Accordingly, when the car control request including a particular control command for the vehicle is later received from the user terminal 110, the car access device 120 can transmit the car control request to the car control device 130 to enable the control of the car through the user terminal 110.

It is also possible that, if the authentication result is authentication success, the car access device 120 obtains a secure wireless channel between the car control device 130 and the user terminal 110 in order to transmit the control command from the user terminal 110 to the car control device 130. Here, the car control device 130 can obtain the secure wireless channel by use of the MSK obtained while performing access authentication in FIG. 3.

Figure 4:
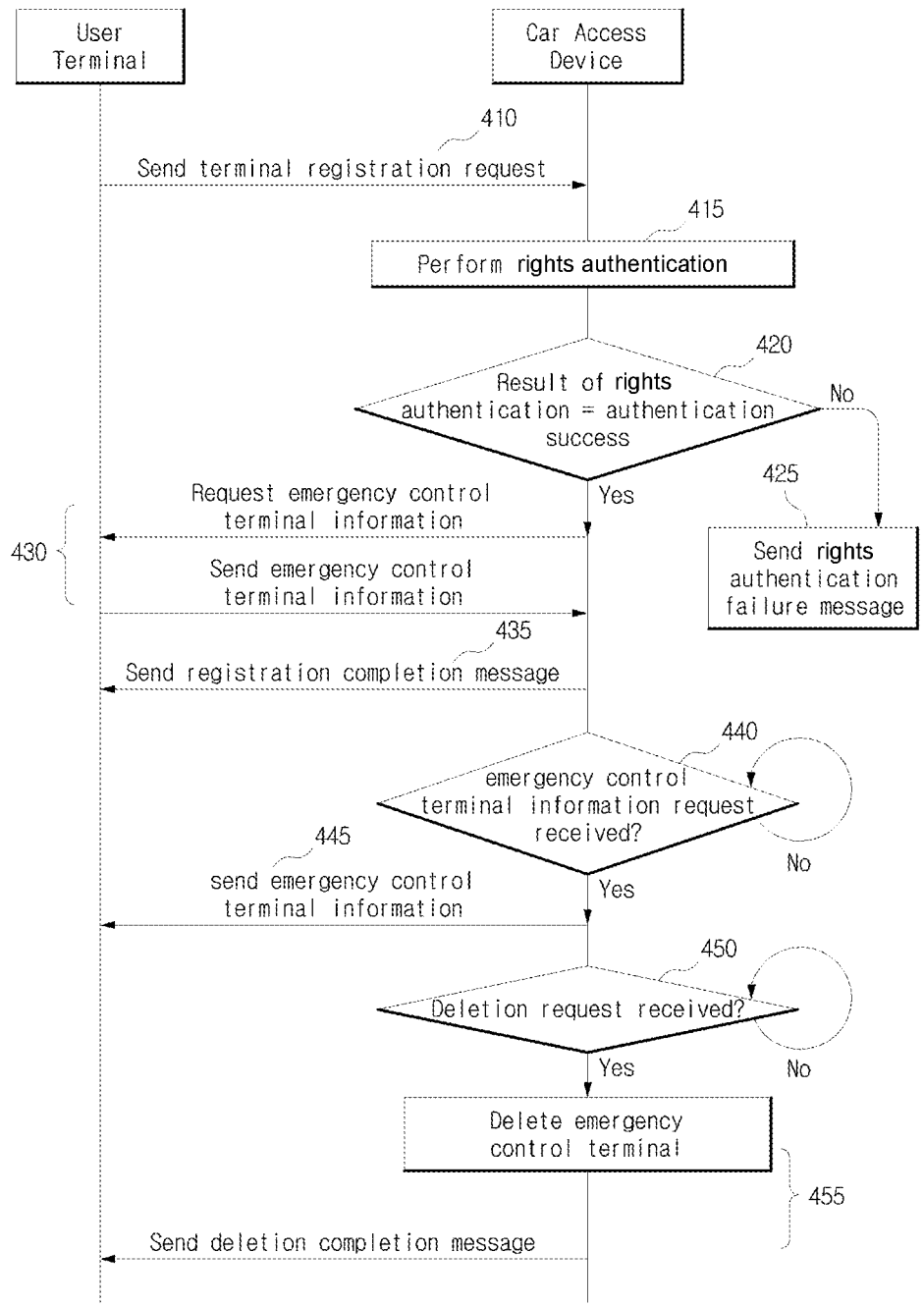
FIG. 4 is a flow diagram illustrating a method of registering the emergency control terminal to control the car in an emergency mode using a car access device according to an exemplary embodiment.

FIG. 4 is a flow diagram illustrating a method of registering an emergency control terminal to control the car in an emergency mode using the car access device according to an exemplary embodiment. Described hereinafter are operations in which the user terminal that has normally completed access authentication in the authentication server 140 registers the emergency control terminal through the car access device 120.

Although it is described in FIG. 4 for the convenience of description and understanding that the user terminal 110 registers the emergency control terminal through accessing the car access device 120, it is also possible that any terminal owned by a properly authorized administrator registers the emergency control terminal through accessing the car access device 120 using user information (e.g., at least one of ID and password).

In operation 410, the user terminal 110 transmits a terminal registration request to the car access device 120. Here, the terminal registration request can include at least one of the terminal information and the user information of the user terminal 110. The user information can be at least one of user identification information and a password.

In operation 415, the car access device 120 performs rights authentication for the user terminal 110 using at least one of the terminal information and the user information included in the terminal registration request. Here, the rights authentication is an authentication process for verifying whether the user terminal 110 or the administrator has rights to register the emergency control terminal through the car access device 120.

For example, the car access device 120 can perform the rights authentication corresponding to the user terminal 110 by checking whether at least one of the terminal information and the user information is already registered and whether the rights given to at least one of the terminal information and the user information is a right that allows registration of a terminal.

In operation 420, the car access device 120 determines whether a result of rights authentication for the user terminal 110 is an authentication success.

If the result is an authentication failure, in operation 425, the car access device 120 generates and sends a registration rights authentication failure message to the user terminal 110 and the process ends.

If, however, the result is an authentication success, in operation 430, the car access device 120 sends a request for terminal information registration that is required for an authentication of the emergency control terminal to the user terminal 110. Here, the terminal information (referred to as "emergency control terminal information" hereinafter, for the convenience of description and understanding and by way of an example) is information for identifying the emergency control terminal and can be at least one of a MAC address, an IMSI and a telephone number. Here, the emergency control terminal can include the user terminal 110.

In operation 435, the car access device 120 registers the emergency control terminal information in correspondence with the vehicle identification information and then sends a registration completion message to the user terminal 110.

In operation 440, the car access device 120 checks whether a request for emergency control terminal information is received from the user terminal 110. Here, the request for emergency control terminal information can include at least one of the terminal information or administrator information of the user terminal 110 or the vehicle identification information.

If the request for emergency control terminal information is received, in operation 445, the car access device 120 extracts the emergency control terminal information registered in correspondence with the user terminal 110 from a database and sends the emergency control terminal information to the user terminal 110. Accordingly, the user terminal 110 can display information about the registered emergency terminal using the received emergency control terminal information.

If, however, the request for emergency control terminal information is not received, in operation 440, the car access device stands by until the request for emergency control terminal inquiry is received. Of course, in an exemplary embodiment, the car access device 120 may process other requests received from the user terminal 110 in the meantime.

In operation 450, the car access device 120 determines whether a request for deletion of an emergency control terminal is received from the user terminal 110. Here, the request for deletion of emergency control terminal can include information on at least one of the terminals to be deleted, for example, at least one of the terminal information or the administrator information of the user terminal 110 and the vehicle identification information.

If the request for deletion of emergency control terminal is received, in operation 455, the car access device 120 deletes the emergency control terminal information corresponding to the information about the terminal to be deleted that is included in the request for deletion of the emergency control terminal. Then, the car access device 120 sends a deletion completion message to the user terminal 110.

If, however, the request for deletion of an emergency control terminal is not received, in the operation 450, the car access device 120 stands by until the request for deletion of an emergency control terminal is received.

Although it is described in FIG. 4 that at least one of a terminal registration request, a terminal information request, and a terminal deletion request is possible when the rights of the user terminal 110 is authenticated, it is also possible that the car access device 120 performs the rights authentication of the user terminal 110 every time any of a terminal registration request, a terminal information request, and a terminal deletion is carried out. In an exemplary embodiment, the user terminal 110 may also request to edit information about an existing emergency control terminal.

Figure 5:
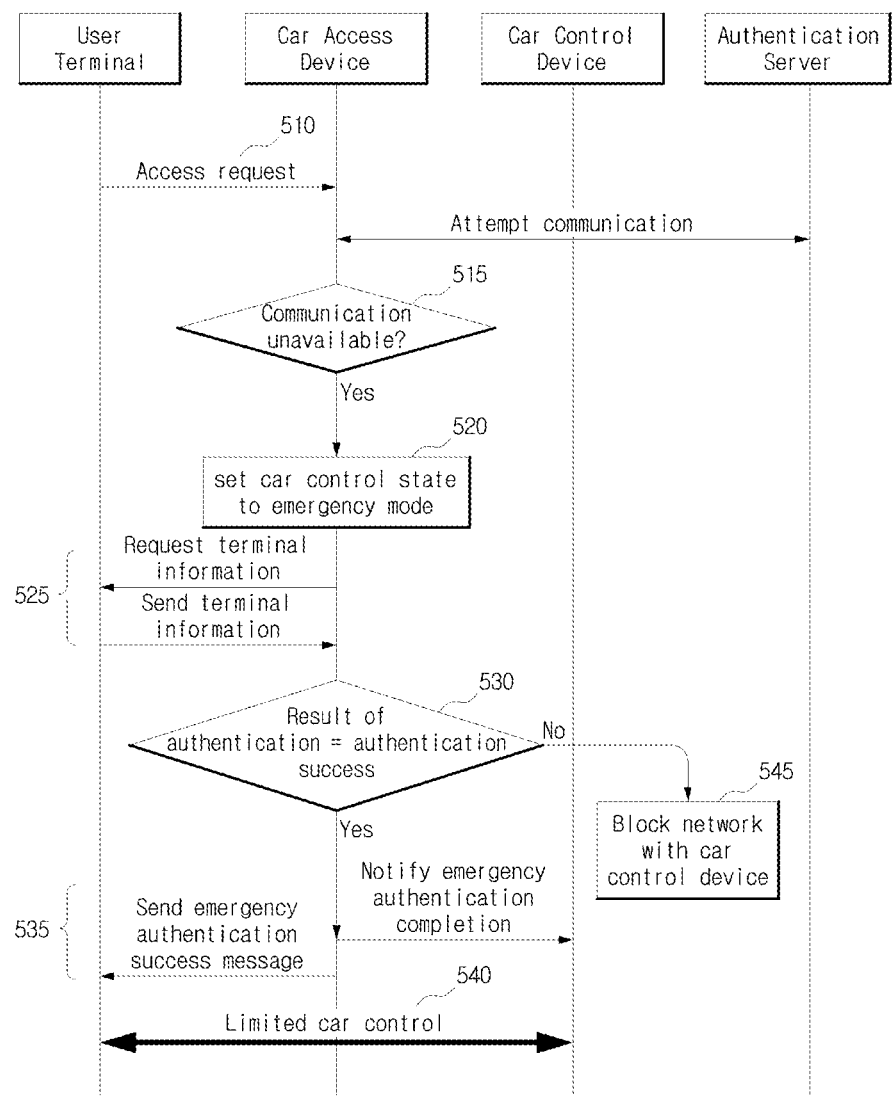
FIG. 5 is a flow diagram illustrating a method of controlling the car in case the car access device is not able to communicate with an authentication server for a predetermined duration according to an exemplary embodiment.

FIG. 5 is a flow diagram illustrating a method of controlling the car in case the car access device is not able to communicate with the authentication server for a predetermined duration according to an exemplary embodiment. Described hereinafter are operations in which the car access device 120 performs emergency access authentication for the user terminal while communication is not available between the car access device 120 and the authentication server 140.

In operation 510, the car access device 120 receives an access request from the user terminal 110.

In operation 515, the car access device 120 attempts communication with the authentication server 140 and determines whether communication is available.

If communication is available, access authentication is carried out for the user terminal, as described above with reference to FIGS. 2 and 3, for example, and thus the description thereof will be omitted.

If, however, communication is not available, in operation 520, the car access device 120 sets the car control state to the emergency mode.

In an exemplary embodiment, the emergency mode is a mode in which a one-way access authentication is performed to provide a limited control of the car using the user terminal 110 and in which a normal control of the vehicle is unavailable, and the user terminal 110 is only provided with an ignition control. Accordingly, when the car access device 120 sets the car control state to the emergency mode, the user terminal 110 cannot perform various control functions, such as inquiring about the vehicle state and turning on emergency blinkers, functions other than the ignition control.

In operation 525, the car access device 120 requests and obtains terminal information for authentication of the user terminal 110. Here, the terminal information can be at least one of a MAC address, an IMSI and a telephone number of the user terminal 110. The terminal device provides the terminal information in response to the request.

In operation 530, the car access device 120 checks whether the terminal information obtained from the user terminal 110 matches with the pre-registered terminal information, performs an authentication of the user terminal 110, and then determines whether the result of the authentication is an authentication success.

It is also possible that in an exemplary embodiment, the car access device 120 can further obtain pre-registered user information (e.g., ID and password) required for an authentication from the user terminal 110 and use the obtained user information for the authentication.

As such, the car access device 120 can perform the one-way access authentication of the user terminal 110 when communication with the authentication server 140 is unavailable.

If the result of authentication is an authentication success, in operation 535, the car access device 120 generates an emergency authentication completion message and sends the generated emergency authentication completion message to the car control device 130. Then, the car access device 120 generates and sends an emergency authentication success message to the user terminal 110.

Then, in operation 540, the user terminal 110 sends a request for a limited car control to the car control device 130 through the car access device 120, pursuant to receiving the emergency authentication success message from the car access device 120.

For example, the user terminal 110 can activate limited control functions, such as the vehicle ignition function, among the car control functions of the application for controlling the car in the user terminal 110 pursuant to the emergency authentication in the emergency mode, and can deactivate all other car control functions. In such a case, the use can be prevented from selecting the deactivated car control functions.

For instance, the car control function activated in the user terminal 110 pursuant to the emergency mode can be the ignition control function, and the deactivated car control functions can be functions such as inquiring about the vehicle state and registering an emergency key.

It is of course possible that the user terminal 110 does not deactivate some of the car control functions of the application. In such a case, if a car control request that is not allowed in the emergency mode is received from the user terminal 110, the car access device 120 will not relay this request to the car control device 130.

However, if the authentication result of operation 530 is an authentication failure, the car access device 120 blocks the network with the car control device 130 in operation 545. As a result, the car access device 120 blocks the user terminal 110 from accessing the car control device 130 through the car access device 120.

As such, if a communication between the car access device 120 and the authentication server 140 becomes available while the user terminal 110 is provided with a limited control of the car in the emergency mode based on the emergency access authentication with the car access device 120, a normal access authentication for the user terminal 110 can be carried out, for example, as described above with reference to FIGS. 2 and 3. In such a case, the car access device 120 can switch the car control state from the emergency mode to the normal mode and perform access authentication in accordance with an exemplary embodiment described with reference to FIGS. 2 and 3.

Figure 6:
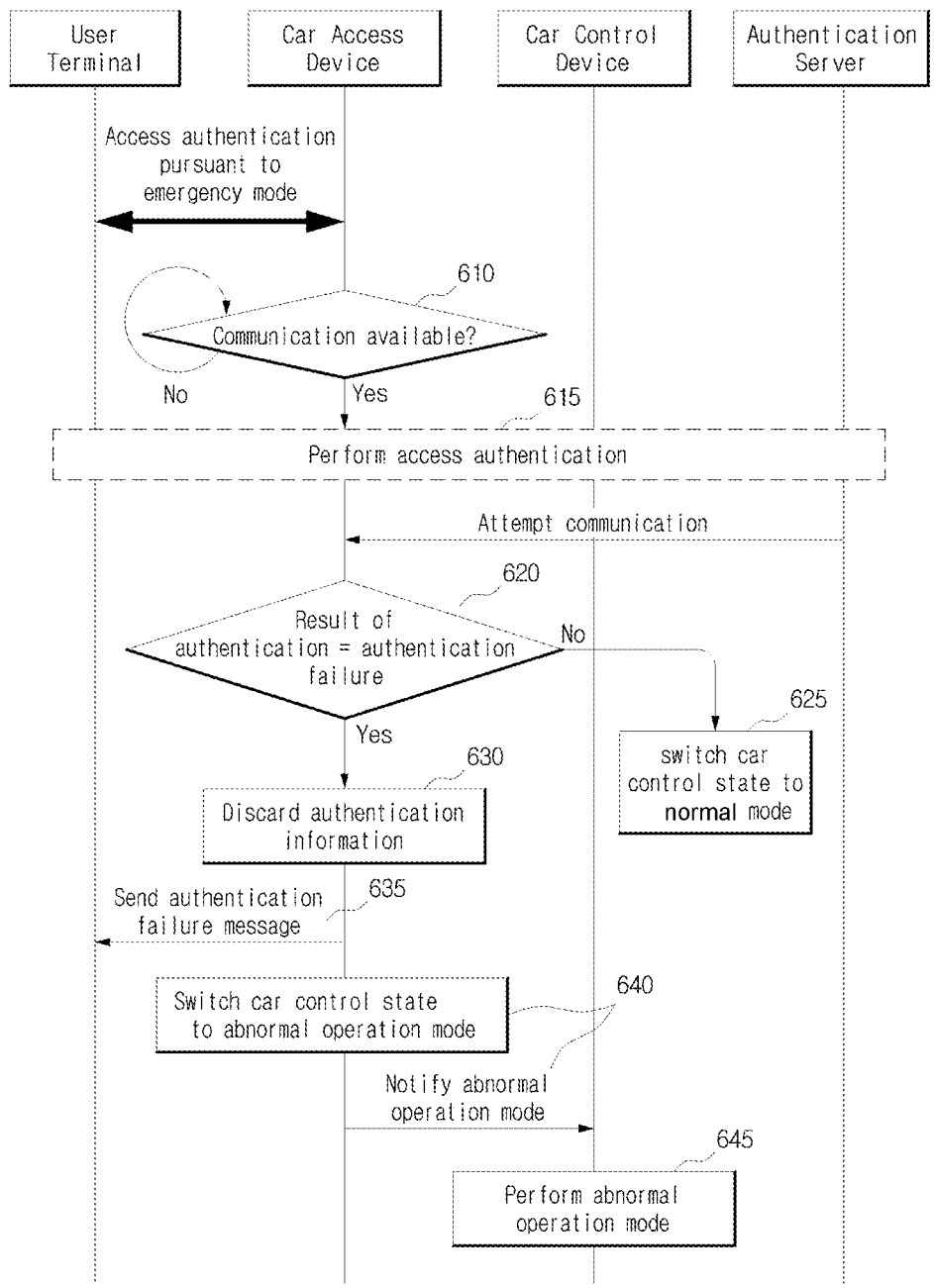
FIG. 6 is a flow diagram illustrating a method of controlling the car if the authentication for access to the user terminal fails when the emergency mode is changed to a normal mode in the car control system according to an exemplary embodiment.

FIG. 6 is a flow diagram illustrating a method of controlling the car if the access authentication of the user terminal fails when the emergency mode is changed to the normal mode in the car control system according to an exemplary embodiment.

Hereinafter, an access authentication method will be described with reference to FIG. 6 which illustrates a case in which communication with the authentication server 140 becomes available after the car access device 120 performs the one-way emergency access authentication for the user terminal 110 without linking to the authentication server 140 while communication is unavailable between the car access device 120 and the authentication server 140.

In operation 610, the car access device 120 determines whether communication is available by attempting to communicate with the authentication server 140 at regular intervals after performing the emergency access authentication pursuant to the emergency mode.

If communication is unavailable, the operation 610 is repeated.

However, if communication is available, in operation 615, the car access device 120 requests the authentication server 140 to perform access authentication for the user terminal 110 and performs access authentication for the user terminal 110. This authentication using the authentication server 140 is somewhat analogous to the authentication in an exemplary embodiment described with reference to FIGS. 2 and 3 and thus will be omitted.

In operation 620, the car access device 120 determines whether the result of authentication is an authentication success, by receiving the result of authentication pursuant to the access authentication from the authentication server 140.

If the result of authentication is an authentication success, in operation 625, the car access device 120 can switch the car control state from the emergency mode to the normal mode and relay this to the car control device 130 so that the user terminal 110 can control the car normally. That is, when the control is switched to the normal mode, the user terminal 110 is provided with full control of the car. This operation is somewhat similar to the operation 230 described with reference to FIG. 2.

However, if the result of authentication is authentication failure, in operation 630, the car access device 120 discards the authentication information (i.e., the terminal information) for the user terminal 110 or registers the authentication information in a black list.

In operation 635, the car access device 120 transmits an authentication failure message to the user terminal 110.

Then, in operation 640, the car access device 120 sets the car control state to an abnormal operation mode and notifies that the car is in the abnormal operation mode to the car control device 130.

Accordingly, in operation 645, the car control device 130 controls the vehicle to perform operations that are preset in correspondence with the abnormal operation mode.

In an exemplary embodiment, the operations in the abnormal mode can include various notifications that indicate that the vehicle is being operated in an abnormal state, for example, limiting the maximum driving speed, turning on the emergency blinkers, sounding the horn, etc. Moreover, it is possible that in the abnormal operation mode, the car control device 130 controls the vehicle to be incapable of being operated while the car is stopped or parked.

In another exemplary embodiment, it is possible that while the vehicle is operated in the abnormal mode, the car control device 130 controls the car to be operated for a predetermined duration and then to be slowed down gradually to an eventual stop. In such a case, it is also possible for the car control device 130 to send a message that the vehicle will come to a stop to the user terminal 110.

Figure 7:
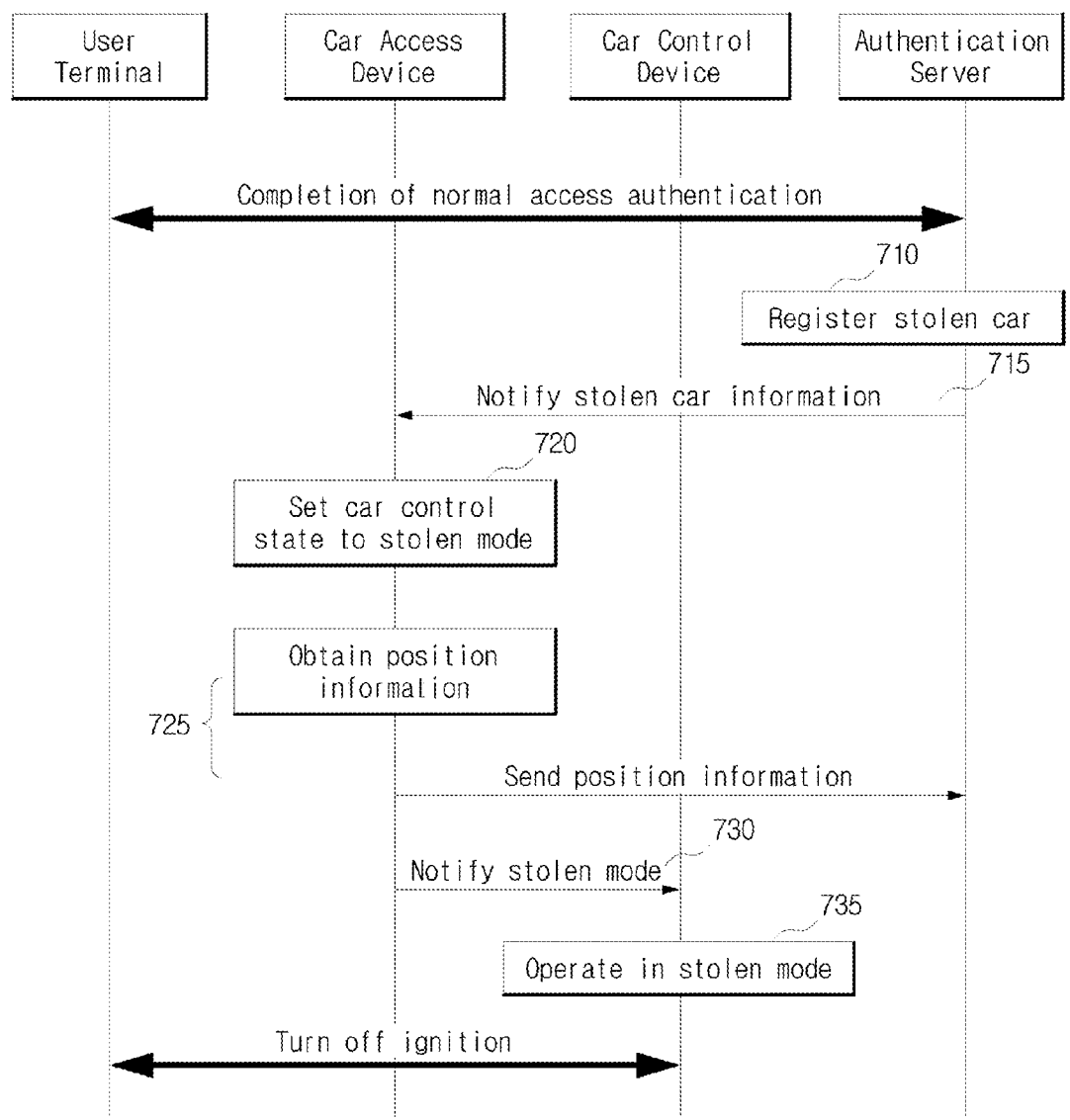
FIG. 7 is a flow diagram illustrating a method of controlling the car pursuant to a stolen car report in the car control system according to an exemplary embodiment.

FIG. 7 is a flow diagram illustrating a method of controlling the car pursuant to a stolen car report in the car control system according to an exemplary embodiment. Described hereinafter is how the car is controlled pursuant to a stolen car report while the car is being operated through a normal authentication.

In operation 710, the authentication server 140 receives a request to register a stolen car that includes stolen car identification information from the administrator and registers the stolen car. Specifically, the authentication server 140 can change and set the vehicle state of the vehicle identification information corresponding to the stolen car identification information to a stolen car.

Then, in operation 715, the authentication server 140 sends stolen car information to the car access device 120.

The authentication server 140 has the vehicle identification information and information about the car access device 120 pre-stored in the database thereof. Accordingly, the authentication server 140 can send the stolen car information to the car access device 120 installed in the stolen car.

In operation 720, the car access device 120 sets the car control state to a stolen mode, pursuant to receiving the stolen car information from the authentication server 140.

Here, the car access device 120 can change the car control state to the stolen mode after performing authentication with the authentication server 140 based on a client-server P2P (Peer-to-Peer) secure channel of RADIUS and DIAMETER.

In operation 725, the car access device 120 obtains its own position information in correspondence with the stolen car mode and then sends the obtained position information to the authentication server 140. The authentication server 140 can send the position information to a corresponding police system (not shown) to enable real-time tracking of the stolen car.

In operation 730, the car access device 120 notifies the car control device 130 that the stolen mode has been set.

Accordingly, in operation 735, the car control device 130 can control the vehicle to be operated in the stolen mode. In an exemplary embodiment, the car can be operated in the stolen mode by limiting the maximum driving speed, turning on the emergency blinkers, and sounding the horn, and so on.

Then, after the car is set to the stolen mode by the car access device 120, the user terminal 110 is only capable of turning on the ignition and stopping the car, and all other control functions are disabled.

If the vehicle is turned off by the user terminal 110 in the stolen mode, the car access device 120 may not relay a car ignition control request to the car control device 130 even if the car ignition control request is later received by the user terminal 110. Accordingly, the car control device 120 can control the vehicle so as not to start based on requests from the user terminal 110.

Figure 8:
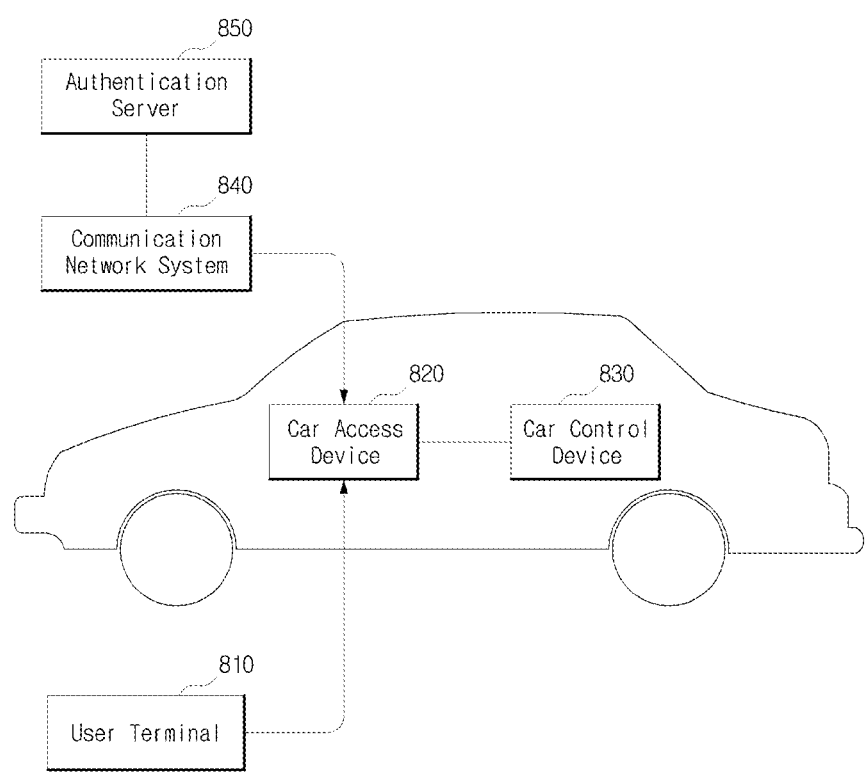
FIG. 8 is a block diagram illustrating a configuration of a car control system in accordance with another exemplary embodiment.

FIG. 8 is a block diagram illustrating a configuration of a car control system in accordance with another exemplary embodiment.

Referring to FIG. 8, the car control system includes a user terminal 810, a car access device 820, a car control device 830, a communication network system 840 and an authentication server 850.

Here, the user terminal 810, the car access device 820, the car control device 830 and the authentication server 850 may be analogous to the ones described above with reference to FIG. 1, and thus no redundant description will be provided herein, but only different configurations from those described above with reference to FIG. 1 will be described herein.

In an exemplary embodiment depicted in FIG. 1, it is illustrated that the authentication server 140 is placed within a communication network system.

In an exemplary embodiment described with reference to FIG. 8, however, it is illustrated that the authentication server 850 is located outside the communication network system 840.

Accordingly, the car access device 820 communicates with the communication network system 840 by use of the RADIUS or DIAMETER protocol, and the communication network system 840 communicates with the authentication server 850, which is located in an external network, separately from the network system 840. Thus, the communication network system 840 can transmit a message to the authentication server 850 through proxying, and the authentication server 850 can perform access authentication in the form of proxy.

For this, the communication network system 840 can carry out a domain routing function to request access authentication by attaching a domain that is distinguished by a car manufacturer for the user terminal 810 accessing the car access device 820.

For example, when terminal information is received from the user terminal 810, the car access device 820 can attach a domain distinguished for each car manufacturer to the terminal information and send the terminal information to the communication network system 840. Accordingly, the communication network system 840 can send the terminal information to the authentication server 850 of the corresponding car manufacturer through proxying and request for access authentication.

In other words, the operations similar to those described above with reference to FIGS. 2 and 3 may be performed except that the car access device 820 sends requests for access authentication to the communication network system 840 by attaching the domain which is different for each car manufacturer or a car rental agency and that the communication network system 840 accesses the authentication server 850 through proxying the respective authentication server 850, and thus the redundant description will not be provided herein. In an exemplary embodiment, there may be a number of different remote authentication servers 850. The communication network system 840 will distinguish the needed authentication server 850 based on the domain information provided from the car access device and proxy to the respective authentication server 850.

Figure 9:
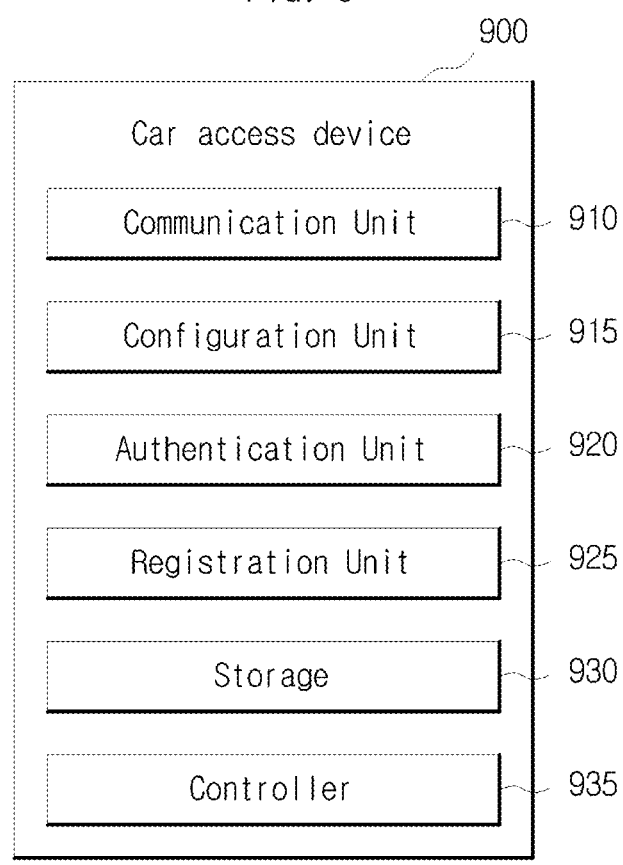
FIG. 9 is a block diagram illustrating an internal configuration of a car access device according to an exemplary embodiment.

FIG. 9 is a block diagram illustrating an internal configuration of a car access device according to an exemplary embodiment.

Referring to FIG. 9, the car access device 900 includes a communication unit 910, a configuration unit 915, an authentication unit 920, a registration unit 925, a storage (such as a memory) 930 and a controller 935.

The communication unit 910 has a plurality of communication modules for communicating data to and from various devices.

For example, the communication unit 910 can have a first communication module and a second communication module, in which the first communication module communicates data based on a short-range communication method and the second communication module communicates data based on a wide area communication method.

The configuration unit 915 configures the car control state for the car i.e. it sets the mode of the car, in which the car access device 120, 820 is installed. For example, the configuration unit 915 can configure the car control state in accordance with at least one of authentication result of the authentication unit 920 and a communication state with the authentication server 140, 850 using the communication unit 910. It is also possible for the configuration unit 915 to configure the car control state in accordance with the vehicle state (e.g., the stolen car information) received from the authentication server 140, 850.

As described above in an exemplary embodiment, the car control state can include one or more of the normal mode, the emergency mode, the abnormal mode, and the stolen mode. Each of the modes has been described already, and thus no redundant description thereof will be provided herein.

The authentication unit 920 is linked to the authentication server 140, 850 in accordance with the communication state of the authentication server 140, 850 to perform access authentication for the user terminal 110 or to perform emergency access authentication without linking to the authentication server 140, 850.

For example, if the communication with the authentication server 140, 850 is available, the authentication unit 920 can request access authentication, which includes at least one of the terminal information of the user terminal 110, 810 and the vehicle identification information obtained through the corresponding car control device 130, 830, to the authentication server 140, 850 and obtain the authentication result.

In another exemplary embodiment, if communication with the authentication server 140, 850 is not available, the authentication unit 920 can obtain at least one of the terminal information of the user terminal 110, 810 and the user information and use the at least one of the terminal information and the user information together with pre-registered emergency terminal information to perform emergency access authentication for the pertinent user terminal 110, 810 and generate and output the authentication result to the controller 935.

While the car access device 900 is in a normal communication with the authentication server 140, the registration unit 925 receives as input the emergency terminal information, which allows the terminal to operate the vehicle in an emergency situation. The input is received from the authenticated user terminal 110, 810, which has been authenticated by the authentication server 140, and the car access device 900 registers the emergency terminal information.

The storage 930 stores a variety of algorithm required for operating the car access device in accordance with an exemplary embodiment. Moreover, the storage 930 stores the emergency terminal information registered using the registration unit 925.

The controller 935 controls internal components of the car access device in accordance with an exemplary embodiment, namely, the communication unit 910, the configuration unit 915, the authentication unit 920, the registration unit 925, the storage 930, and etc.

Moreover, the controller 935 can provide limited relay of the car control request from the user terminal 110, 810 in accordance with the car control state configured using the configuration unit 915. This is analogous to an exemplary embodiment described above, and thus no redundant description thereof will be provided herein.

The car control method using a user terminal in accordance with an exemplary embodiment can be embodied in the form of program instructions, which can be performed through various electronic data processing means, and can be written in a storage medium, which can include program instructions, data files, data structures and the combination thereof.

The program instructions stored in the storage medium can be designed and configured specifically for an exemplary embodiment or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of exemplary embodiments, and the opposite is also possible.

Although exemplary embodiments have been described above, it will be appreciated that there can be a variety of permutations and modifications of the exemplary embodiments by those of ordinarily skill in the art to which the exemplary embodiments pertain without departing from the technical ideas and scope of the present disclosure, which will be defined by the appended claims and their equivalents. As described above, exemplary embodiments are merely exemplary and are not to be construed as limiting. Those skilled in the art can implement various changes and modifications from the above description of exemplary embodiments. Moreover, various modifications to these exemplary embodiments will be readily apparent to those skilled in the art, and the generic principles and specific examples defined herein may be applied to other embodiments.

What is claimed is:

1. A car access device for controlling a car comprising:
   a first communication unit which communicates with a mobile user terminal;
   a second communication unit which is non-portably installed in the car and which communicates with a car control device that controls a plurality of functions executed in the car;
   a third communication unit which communicates with an authentication server to authenticate the mobile user terminal requesting control of the car; and
   a controller which controls the first communication unit, the second communication unit, and the third communication unit,
   wherein if communication with the authentication server is not available, the car access device is configured to:
   generate an emergency authentication result by checking whether the user terminal is a registered emergency terminal, perform the emergency authentication without linking to the authentication server, and set a car control state to an emergency mode based on the emergency authentication result, wherein the car access device is configured to obtain the terminal information from the user terminal and is configured to perform the emergency authentication by checking whether the terminal information is included in pre-registered emergency terminal information.

2. The car access device for controlling a car of claim 1, wherein if communication with the authentication server is available, user information received by the first communication unit is relayed to the third communication unit for transmission to the authentication server, wherein the third communication unit receives from the authentication server results of an authentication based on the user information, wherein if the results of the authentication indicate that the mobile user terminal is authorized, the second communication unit relays requests for controlling the car from the mobile user terminal to the car control device.

3. The car control system of claim 1, wherein a limited car control request of the user terminal is relayed to the car control device in the emergency mode.

4. The car control system of claim 3, wherein the limited car control request is a car ignition control.

* * * * *